United States Patent [19]

Németh et al.

[11] Patent Number: 4,670,901

[45] Date of Patent: Jun. 2, 1987

[54] SINGLE OR MULTI-STAGE SWITCHING FIELD FOR TELEPHONE EXCHANGES

[75] Inventors: Attila Németh, Törökbálint; Gyula Dolozselek, Budapest; László Mikics, Budapest; BélaMolnár, Budapest; Mihály Sallai, Budapest; Sándor Liska, Budapest; Gyula Speck, Budakeszi, all of Hungary

[73] Assignee: BHG Hiradastechnikai Vallalat, Budapest, Hungary

[21] Appl. No.: 818,990

[22] Filed: Jan. 10, 1986

Related U.S. Application Data

[63] Continuation of Ser. No. 509,242, Jun. 29, 1983, abandoned.

[30] Foreign Application Priority Data

Jul. 1, 1982 [HU] Hungary ............................... 2146/82

[51] Int. Cl.[4] .............................................. H04Q 3/52
[52] U.S. Cl. .................................. 379/292; 340/825.8
[58] Field of Search ................. 179/18 GF; 340/825.8

[56] References Cited

U.S. PATENT DOCUMENTS

| | | | |
|---|---|---|---|
| 3,976,845 | 8/1976 | Ashley | 179/18 GF |
| 4,075,608 | 2/1978 | Koenig | 340/825.8 |
| 4,264,895 | 4/1981 | Mukaemachi et al. | 179/18 GF X |

OTHER PUBLICATIONS

"Semiconductor High-Voltage Crosspoint Switch for Totally Electronic Switching System", T. Kariya et al., Hitachi Review (Japan), vol. 29, No. 3, Jun. 1980, pp. 131-136.

Primary Examiner—Thomas W. Brown
Attorney, Agent, or Firm—Karl F. Ross; Herbert Dubno

[57] ABSTRACT

A multi-stage switching-field formed with switching matrices containing thyristors for stored program controlled switching devices, established by reversal at the last stage, without the use of transformers or other reactive elements therein (e.g. capacitance), in the last stage a holding circuit remains invariable upon switching on, furthermore allocating and switching circuits are ordered to the coupling paths instead of the stages. Circuit arrangements of the switching-field provide the possibility for attenuation control too, and do not require voltages of opposite polarity, while at the same time provide an interface requiring uniform, short operations towards the stored program control device. The switching matrices are switched on at minimal power-level, thus the switching of each further coupling path or connection does not increase the noise level of the already existing connections. The switching-field provides effective protection against unwarranted disconnections caused by noise arriving from the lines, and ensures through impedance matching to attain the optimal ratios of the insertion loss, dynamic range of the connections, and cross-talk attenuation between the different connections. The circuits developed for the switching-field according to the invention are suitable also for production with hydrid or monolithic technology.

7 Claims, 5 Drawing Figures

SINGLE OR MULTI-STAGE SWITCHING FIELD FOR TELEPHONE EXCHANGES

This is a continuation application of copending application Ser. No. 509,242 filed on June 29, 1983, now abandoned.

FIELD OF THE INVENTION

The invention relates to single or multi-stage switching-field with coupling path, formed with switching matrices containing thyristors for stored program controlled switching devices, e.g. telephone exchanges suitable for the interconnection and attenuation control of noisy lines, in which the connections are set up, maintained, controlled and disconnected upon a short command given by the stored program control device.

BACKGROUND OF THE INVENTION

There are switching-fields with a coupling path formed with switching matrices containing thyristors suitable for use in stored program controlled telephone exchanges. Such is described for instance in the French patent specification No. 2 357 132. This switching-field is characterized in that transformers are connected to the input of the first stage and to the output of the last stage, and two different voltage sources are connected through resistors to the centers of the secondary and primary coils of the transformers to supply the holding current necessary for maintaining the connection already set up, while upon disconnection a third, opposed polarity voltage source is connected to the outputs of the last stage, which reduces the holding current of the connection to zero. Further characteristics of the switching-field described in the quoted specification is that the circuits carrying out the allocation and switching of the connections are formed stage by stage and are connected through logical circuits to the stored program control device.

As a result of the transformer connected to the output of the last stage, three transformers will be used in all such connections which are set up between the lines connected to the transformers joined to the inputs of the first stage. This entails the disadvantage that in case of transformers characterized with identical parameters, the transmission parameters of the connection are worse than in case when only two transformers are used. Such switching is also possible in the switching-field according to the quoted patent specification, but in this case only the inputs of the first stage can be connected with the outputs of the last stage, in other words the number of stages participating in the connection is less, which results in the increase of the loss given by the internal blocking of the switching-field. The incorporation of the third transformer increases the specific volume of the switching-field characteristic to one connection, which represents a further disadvantage. Further drawback of the quoted solution is that the first voltage source necessary to maintain the holding current is connected through a resistor to the center of the secondary coils of the transformers joined to the inputs of the first stage. Upon switching on—when two or more coupling paths are connected to a given input of the first stage—the holding currents of these coupling paths would be of reduced value, which detrimentally influences the dynamic performances and the insensitivity against disturbances. The fact that the polarity of the third voltage source is opposite to that of the first two voltage sources represents further disadvantage in many cases. The allocating and switching-on circuits, utilized stage by stage, unnecessarily increase the number of units built into the switching-field, because the inner information content of a multi-stage switching-field with coupling path is not utilized. The same disadvantage arises in respect of the adjoining logical circuits too, which unnecessarily increase the number of wires running towards the stored program control device. All these finally increase the power consumption of the switching-field. At the same time the direct connection of the logical circuits to the stored program control device means that the control device has to suspend all other activities at setting up or clearing each connection.

OBJECT OF THE INVENTION

The aim of the invention is to eliminate the above disadvantages by providing such solution, where all connections in the switching-field are established by reversal at the last stage, without the use of transformer or other reactive elements (e.g. capacitance), the holding circuit remains invariable upon switching on, furthermore the allocating and switching circuits are connected to the coupling paths instead of the stages. The circuits arrangements of the switching-field provide the possibility for attenuation control too, and do not require voltages of opposite polarity, at the same time provide an interface requiring uniform, short operations towards the stored program control device. The thyristor switching matrices are switched on at minimal power-level, thus the switching of each further coupling path or connection does not increase the noise level of the already exiting connections. The switching-field provides effective protection against unwarranted disconnections caused by noise arriving from the lines, and ensures through impedance matching to attain the optimal ratios of the insertion loss, dynamic range of the connections and cross-talk attenuation between the different connections. The circuits developed for the switching-field according to the invention are suitable also for production with hydbrid or monolithic technology.

SUMMARY OF THE INVENTION

The invention relates to single or multi-stage switching-field with coupling path formed with switching matrices containing thyristors for stored program controlled switching devices, particularly for telephone exchanges, characterized in that the telephone lines interconnected selectively according to the demand are conected to the primary coils of 1:n transmission transformers of the line units joined to the first or single switching stage of the switching-field, the center of the secondary coils of the transformers is connected to a first voltage source and the ends to the input telephone lines of the switching matrices of the first or single switching stage. The output telephone lines of the switching matrices of the first switching stage are connected through coupling paths to the input telephone lines of the switching matrices of the second swtiching stage, controlled dual current sources and dual comparators are connected to the output telephone lines of the switching matrices of the last or single switching stage, and each pair of these output telephone lines is looped back partly by diodes connected to each output telephone line with their cathodes and commoned with their anodes and partly with further diodes, attenuator and additional diodes joined to each output telephone line. Additional controlled dual current sources are connected to the common points of the diodes commoned with their anodes, as well as to the center of the attenuator, and the dual current sources are connected to a second voltage source, while their control inputs are joined to the storage and matching unit which has two holding stores and one attenuation control store for each pair of the looped back output telphone lines. Coupling path-actuating circuits are ordered to each coupling path, the outputs of which are joined to the input and output allocating lines of the switching matrices, while the inputs are connected to the outputs of the line allocating circuits, the data-inputs of which are connected to a latch, while their enable input is connected to a monostable multivibrator. The dual comparators connected to the output telephone lines of the last switching stage adjoin to the inputs of a line selector.

Further characteristic of the invention is that it has input actuating circuits consisting of resistors which are common for the identically numbered input allocating lines of a group of the switching matrices of the first switching stage. One of the outputs of the actuating circuits ordered to the coupling paths is connected similarly by a resistor to the input allocating line pertaining to the coupling, and to the output allocating line pertaining to the coupling paths it is connected through the collector of a PNP transistor, the emitter of which is connected to a third voltage source. The common points of the resistors joined to the base of the transistors of the actuating circuits ordered to the coupling paths and the common points of the resistors connected to the input allocating lines form the inputs of the coupling path-actuating circuits, which are TTL or TTL-compatible logical circuits and their allocated outputs are provided with logical NOT-gates.

In case of a preferable construction for realization, the controlled dual current sources connected to the output telephone lines of the switching matrices of the last switching stage contain two PNP transistors, where one of the resistors of the common base dividers and their individual emitter resistors are connected to the second voltage source, while the outputs of the storage and matching unit are connected to the other resistors of the base divider, as to the control input.

In a further preferable construction the common points of the diodes commoned with their anodes looping back the output telephone lines of the switching matrices of the last switching stage are connected—instead of the controlled dual current sources connected to the common points and controlled dual current sources connected to the center of the attenuator—to a controllable quadruple current source, which has for output PNP transistors, each pair having common emitter resistors and common base dividers. The emitter resistors and one member of the base dividers are joined to the second voltage source, while the other parts of the base dividers, as control inputs are joined to the outputs of the stored and matching unit.

In a further preferred construction of the invention the inputs of the dual comparators connected to the output telephone lines of the switching matrices of the last switching stage are formed by one end of the base dividers of the PNP transistors connected with their emitters to the second voltage source and the dividers joined to the collectors are connected to a NAND-gate provided with Schmitt-trigger input. Each output in the storage and matching unit is provided with holding stores, two of which are co-ordinated according to the loop of the output telephone lines of the last stage, and the output of one of these holding stores is connected to the same inputs of two logical NAND-gates, while the other inputs of the NAND-gates are connected to the outputs of the attenuation control store, and the outputs of the gates are connected through the matching unit to the control inputs of the quadruple current source. In case of the construction preferred for production, the switching matrices of two consecutive switching stages, the corresponding input-actuating circuits, the coupling path-actuating circuits and/or output-actuating circuits, the line allocating circuits connected to their inputs are aranged on a printed circuit board and the interconnections are formed with printed wiring.

BRIEF DESCRIPTION OF THE DRAWING

The drawings illustrate the solution according to the invention given as an example including the elements essential for understanding the essence of the invention, but the subject of the invention is not restricted to these elements.

SPECIFIC DESCRIPTION

Figure 1:
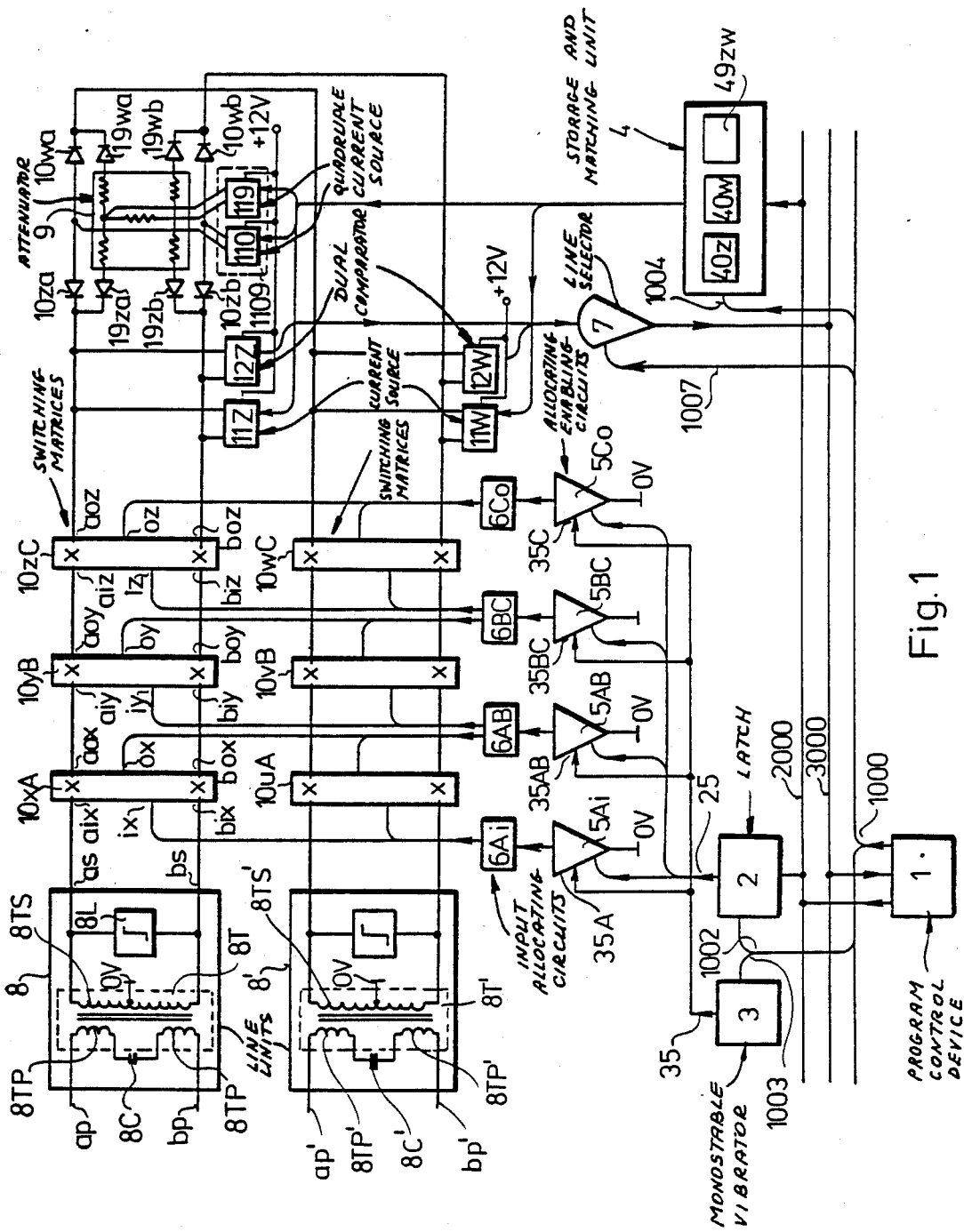
FIG. 1: Three-stage switching-field with coupling path and connection of the control circuits.

FIG. 1 shows the stored program control devices 1 with address bus 1000, output data bus 2000, and input data bus 3000 connected to the switching-field with coupling path, in which audio-frequency connection is realized between the input lines ap, bp of two optional line units 8—as a result of the previous free path hunting—on the switching path shown in the diagram. The loop between the switching matrices 10zC, 10wC of the third stage of the switching-field is formed with controllable dual current sources 11Z, 11W, diodes 10za, 10zb, 10wa, 10wb, 19za, 19zb, 19wa, 19wb, attenuator 9 and controlled quadruple current source 1109. The loop circuits are actuated with the storage and matching unit 4. The writing into the holding store 40z, 40w arranged therein, and those into the attenuation control store 49zw is carried out by the stored program control device 1 with the aid of the data sent on the output data bus 2000 and with the addresses sent on line-cluster 1004 carrying the addresses of the storage and matching unit 4. Under the influence of this, one of the dual current sources 110 or 119 of the controlled quadruple current source 1109 and controllable dual current sources 11Z and 11W get into controlled state. If attenuation has to be inserted into the transmission path, then the dual current source 119—or if this is not necessary—then the dual current source 110 gets into controlled state.

The data informations of the selected path are written from the output data bus 2000 of the stored program control device 1 into the latch 2 as a result of the address sent on the line-cluster 1002 of the latch 2. The data written into the latch 2 are sent to the line allocating data input line-cluster 25 of line allocating circuits 5Ai, 5AB, 5BC, 5Co. A monostable multivibrator 3—under the influence of the signal received on the address-line 1003 of the stored program control device 1—enables the line allocating enable inputs 35A, 35AB, 35BC, 35C for the duration corresponding to the timing of the monostable multivibrator 3 thereby that its output is connected to the input of each line allocating circuit through line 35. The line allocating circuits control the input allocating circuits 6Ai, the coupling path actuating circuits 6AB, 6BC and the output actuating circuits 6Co, which switch on the switching matrices 10xA, 10yB, 10zC of the first, second and third stage by using the input allocating lines ix, iy, iz and output allocating lines ox, oy, oz of the switching matrices. The switching matrices 10uA, 10vB, 10wC of the first, second and third stages are actuated the same way as before in a further actuating cycle.

The switching on is monitored by dual comparators 12Z, 12W. The stored program control device 1 receives information on the state of the comparators with the aid of line selector 7 in such a way that it sends instruction carrying the address of the outputs actuated in actuating cycle on line-cluster 1007 for the line selector 7, as a result of which the information of the selected dual comparators 12Z, 12W is forwarded to the input data bus 3000 of the stored program control device 1.

Transformer 8T of line unit 8 provides galvanic separation between the input lines ap, bp and output lines as, bs of the line unit 8. The input lines ap, bp of line unit 8 are connected to the primary coils 8 TP of transformer 8T. Capacitance 8C of the line unit 8 prevents the biasing of transformer 8T from input lines ap, bp of line unit 8.

Transformer 8T, the ratio of which is 1:n, carries out impedance transformation too in order to influence the insertion loss of the switching-field to a smaller extent by the losses of the switching matrices 10xA, 10yB, 10zC, 10uA, 10vB, 10wC.

The currents of the operating points of the switching matrices 10xA, 10yB, 10zC flow through the center of the secondary coils 8TS of transformer 8T without biasing the transformer towards a first voltage source 0 V. Limiter 8L is used for symmetrical cut-off of the disturbances arriving from the input lines ap, bp. The audio-frequency signal appearing on the output lines as, bs of line unit 8 passes to the input telephone lines 9ix, bix of the switching matrices 10xA of the first stage, and through the matrix it passes to the input telephone lines aiy, biy of switching matrices 10yB of the second stage. The audio-frequency speech signal is sent from the output telephone lines aoy, boy of switching matrices 10yB of the second stage to the input telephone lines aiz, biz which switches it to the output lines aoz, boz. This speech signal is looped back through the intervention of the open diodes 10za, 10wa, 10zb, 10wb, or in case of inserted attenuation through the four diodes 19za, 19wa, 19zb, 19wb and attenuator 9 towards the other line unit 8 through the three switching matrix stages 10wC, 10vB, 10uA.

Figure 2:
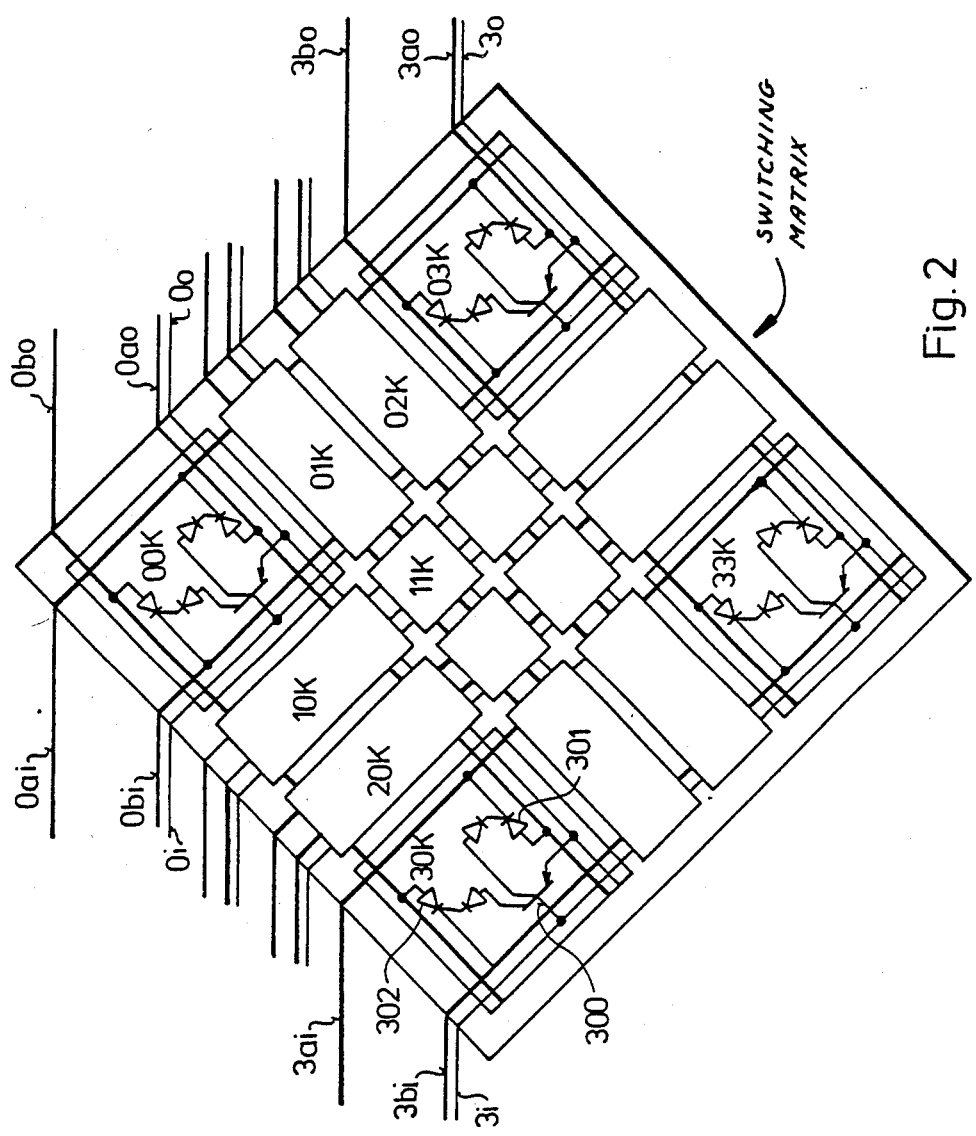
FIG. 2: Arrangement of the elementary switching matrix used as an example in the solution according to the invention.

The switching matrix shown in FIG. 2 is provided with four two-wire inputs and four two-wire outputs, which are the input telephone lines 0ai, 0bi . . . 3ai, 3bi and output telephone lines 0ao, 0bo . . . 3ao, 3bo of the switching matrix. The switching matrix is also provided with four input selector lines, which are the input allocating lines 0i . . . 3i of the switching matrix. The switching matrix has four output selector lines, which are the output allocating lines 0o . . . 3o of the switching matrix. Each cross-point 00K . . . 33K is built up identically, and the switching elements are thyristors. Thyristors 302, 301 of one of the cross-points 30K—drawn in detail—are provided with the current necessary for the ignition by a double-collector transistor 300. This double-collector transistor 300 will supply the thyristors 301, 302 with ignition current when forward (more negative) voltage is switched on to the input allocating line 3i identical with the base of the transistor than to the output allocating line 0o identical with the emitter of the transistor. The current at the operating points necessary for holding the thyristors is supplied by the current sources arranged on the corresponding output telephone lines 0bo, 0ao, and by the current drains arranged on the corresponding input telephone lines 3ai, 3bi.

Figure 3:
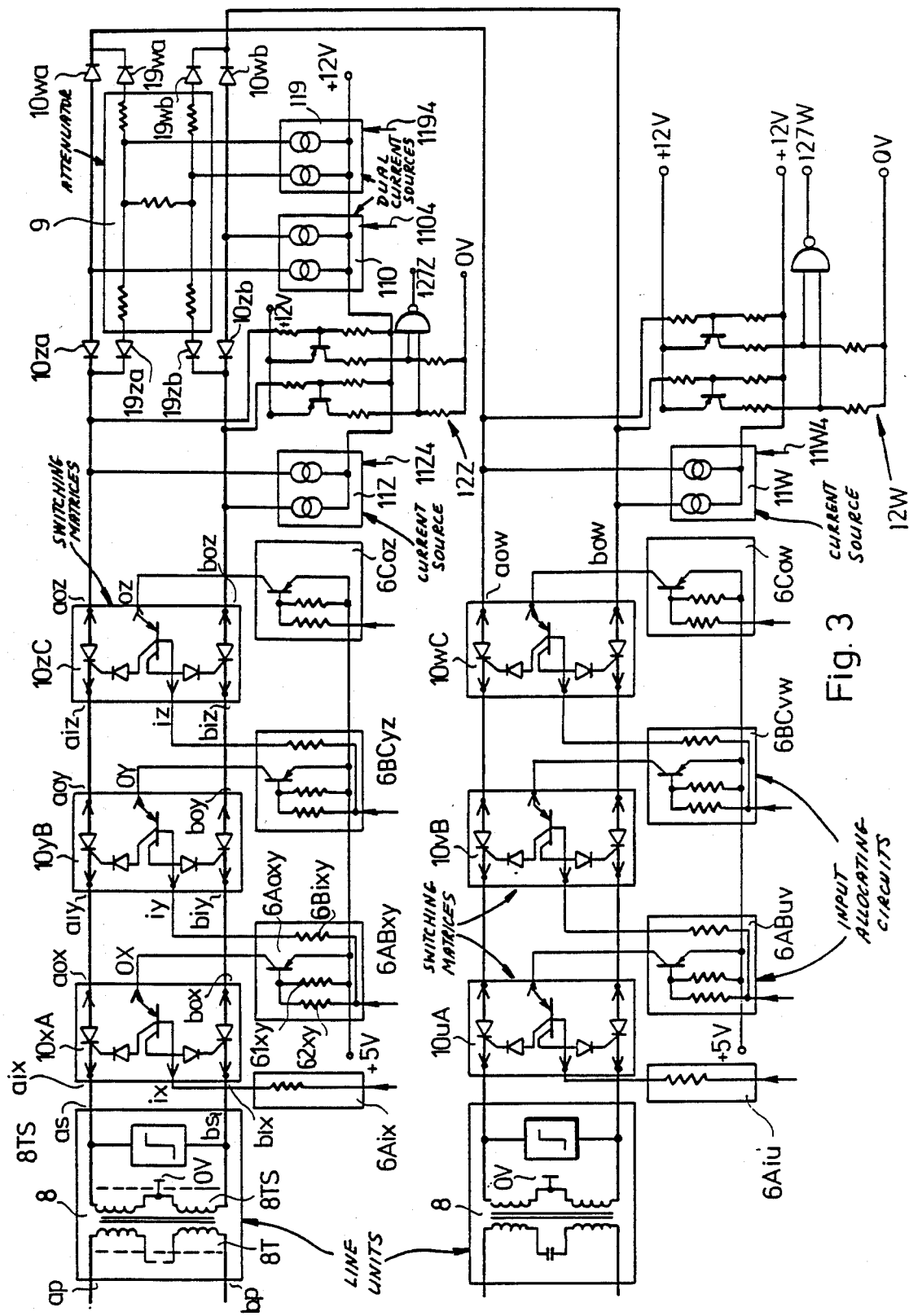
FIG. 3: Single transmission path realized on 2×3-stage switching-field with coupling path of the example with actuating, holding and holding-control circuits.

FIG. 3 shows a single transimission path realized on a 2×3-stage switching-field with coupling path built up from switching matrices containing thyristors, including the actuating, holding and holding-control circuits.

The thyristors of the switching matrices 10xA, 10yB, 10zC, 10uA, 10vB, 10wC are connected serially through the coupling paths between the stages. The current for the operating points is provided by dual current sources 11Z and 110 or 119. The current of one of the current sources 110 or 119 is divided into two equal parts, half of the current flows through diodes 10za, or 19za, the other half through diodes 10wa, or 19wa. The current of the other current source of the dual current sources flows similarly through diodes 10zb or 19 zb and 10wb or 19wb to the anodes of the third stage. The appropriate dual current source is selected by the control signals given to the control inputs 11Z4, 11W4, 1104, 1194. Insertion of the attenuator 9 becomes possible by the control of the dual current source 119. In order to prevent the reduction of the holding current of the thyristors below a given minimal level by the disturbing signals arriving from the line unit 8 and causing the switching off of the thyristors, controlled dual current sources 11Z and 11W are used. These are actuated with signals given to their control inputs 11Z4, 11W4.

The thyristor cross-points of switching matrices 10xA, 10yB, 10zC, 10wC, 10vB, 10uA of the illustrated path can be ignited only when the input allocating lines ix, iy, iz and output allocating lines ox, oy, oz are suitably controlled. The output actuating circuit 6Coz switches a third voltage source +5 V onto the output allocating line oz of the switching matrix 10zC of the third stage for the time of ignition. The input allocating line iz of the same stage—upon control of a coupling path actuating circuit 6BCyz—is connected through a resistor (this is a resistor 6Bixy, in coupling path actuating circuit 6ABxy which has the same structure as coupling path actuating circuit 6BCyz) to the potential of the first voltage source 0 V, and this way all ignition conditions are fulfilled for the switching matrix of the third stage. Upon control of the coupling path actuating circuit 6BCyz, the third voltage source +5 V is switched onto the output allocating line oy too of the switching matrix of the second stage. Upon control of the coupling path actuating circuit 6ABxy, the input actuating line iy is switched on through resistor 6Bixy to 0 V, and thereby the ignition conditions of the switching matrix 10yB of the second stage are also fulfilled. Upon control of the coupling path actuating circuit 6ABxy, the voltage switch consisting of transistor 6Aoxy and resistors 61xy, 62xy switches +5 V voltage onto the output allocating line ox of switching matrix 10xA of the first stage. Upon control of the input actuating circuit 6Aix, the input allocating line ix of switching matrix 10xA of the first stage is connected through the resistor arranged in the input allocating circuit 6Aix to the potential of the first voltage source 0 V, and this way the ignition conditions of the stage are also fulfilled.

The input telephone lines aix, bix of the first switching matrix are connected to the output lines as, bs of line unit 8, and the current at the operating point flowing on the same line is conducted through the secondary coil 8TS of transformer 8T of the line unit 8 to voltage source 0 V.

The build-up and operation of circuits 6Aiu, 6Abuv, 6BCvw, 6Cow used for actuating the half transmission path realized on switching matrices 10wC, 10vB, 10uA following the looping back are identical with that of the discussed signal path actuating circuits 6Aix, 6ABxy, 6BCyz, 6Coz.

The successful switching on of both half paths can be ascertained by use of dual comparators 12Z, 12W. Upon switching on the switching matrices 10xA, 10yB, 10zC of the first half path, the appropriate information appears on output 127Z of the corresponding dual comparators 12Z.

Upon switching on the switching matrices 10uA, 10vB, 10wC of the second half-path the appropriate information appears on output 127W of the corresponding dual comparator 12W.

Figure 4:
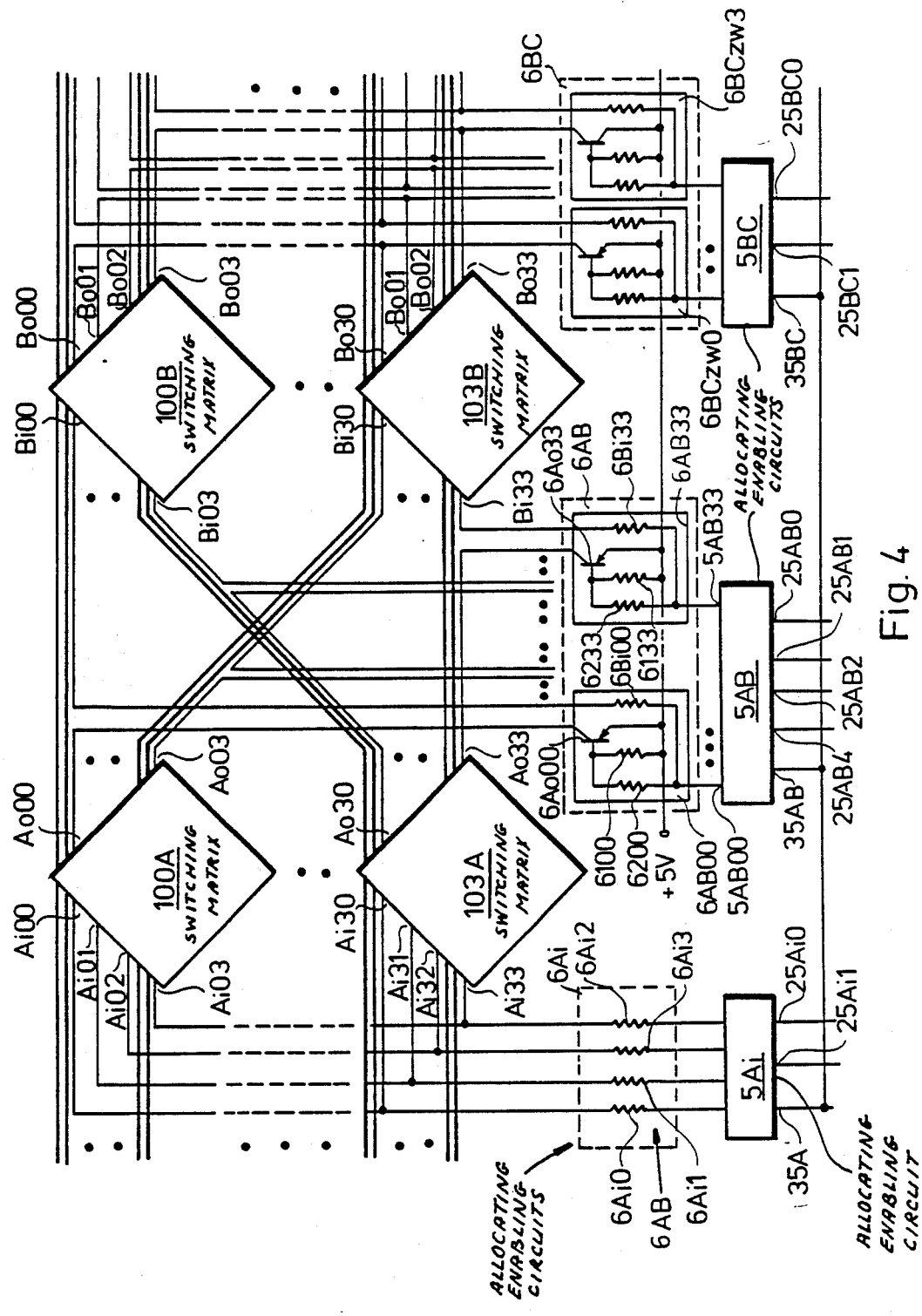
FIG. 4: Arrangement of the two consecutive stage switching-field with coupling path used in the realization of the solution according to the invention, including the control circuits.

FIG. 4 shows the arrangement of two consecutive stages of the switching-field according to the invention. The group of actuating circuits 6AB00 ... 6AB33 of identical build-up arranged in the coupling path actuating circuit 6AB is ordered to the coupling paths between group 100A ... 103A of the four switching matrices of the first stage and group 100B ... 103B of the four switching matrices of the second stage.

Two actuating circuits 6AB00 and 6AB33 are shown in the diagram. One end of the coupling path between the two switching matrices is joined to the output of one of the switching matrices of the first stage, while the other end of the coupling path is joined to the input of one of the switching matrices of the second stage. This way the output actuating point pertaining to the given output of the said switching matrix of the first stage and the input actuating point pertaining to the given input of the said switching matrix of the second stage can be ordered to the coupling path. Such actuating pairs are lines Ao00–Bi00, ... Ao03–Bi30, Ai30–Bi03 ... Ao33–Bi33 as shown in the diagram. The actuating circuit 6AB00 is used for the actuation of line-pairs Ao00–Bi00, while actuating circuit 6AB33 is for the actuation of line-pairs Ao33–Bi33.

A given coupling path is actuated with binary logical levels switched on to the line allocating data inputs 25AB0, 25AB1, 25AB2, 25AB4 of line allocating circuit 5AB. As a result of the enable signal switched on to the enable input 35AB of the line allocating circuit, one of the line allocating outputs 5AB00 ... 5AB33 is selected according to the logical combination given to the line allocating data inputs 25AB0 ... 25AB4 and controls one of the pertaining actuating circuits 6AB00 ... 6AB33. The build-up of the actuating circuits is identical, containing voltage switch and bleeder resistors 6Bi00–6Bi33. The voltage switches consists of resistors 6100 ... 6233, and transistors 6Ao00 ... 6Ao33.

Owing to the above described solution related to the actuation of coupling path AB, the identically numbered operating points of the switching matrices of the first stage, i.e. the lines Ai00–Ai30, Ai01–Ai31, Ai02–Ai32, Ai03–Ai33 shown in FIG. 4. can be multiplied. The input actuating circuit 6Ai is controlled by line allocating circuit 5Ai, which as a result of the binary data-signal switched on to the line allocating data input 25Ai0 and 25Ai1 and line allocating enable input 35A, switches 0 V potential to one of the resistors 6Ai0, 6Ai1, 6Ai2 and 6Ai3 according to the logical combination switched onto the line allocating data inputs. The coupling paths BC are actuated by the coupling path actuating circuit 6BC with control signals produced by the line allocating circuit 5BC. As a result of the binary data signals arriving on line allocating data inputs 25BC0, 25BC1, the line allocating circuit 5BC produces the control signal on one of its outputs for the actuating circutits 6BCzwo ... 6BCzw3 of coupling path actuating circuit 6BC upon the signal given to the line allocating enable input 35BC. The identically numbered output lines Bo00–Bo30, Bo01–Bo31, Bo02–Bo32, Bo03–Bo33 of group 100B ... 103B of the switching matrices of the second stage can be multiplied according to the above described operating principle.

Figure 5:
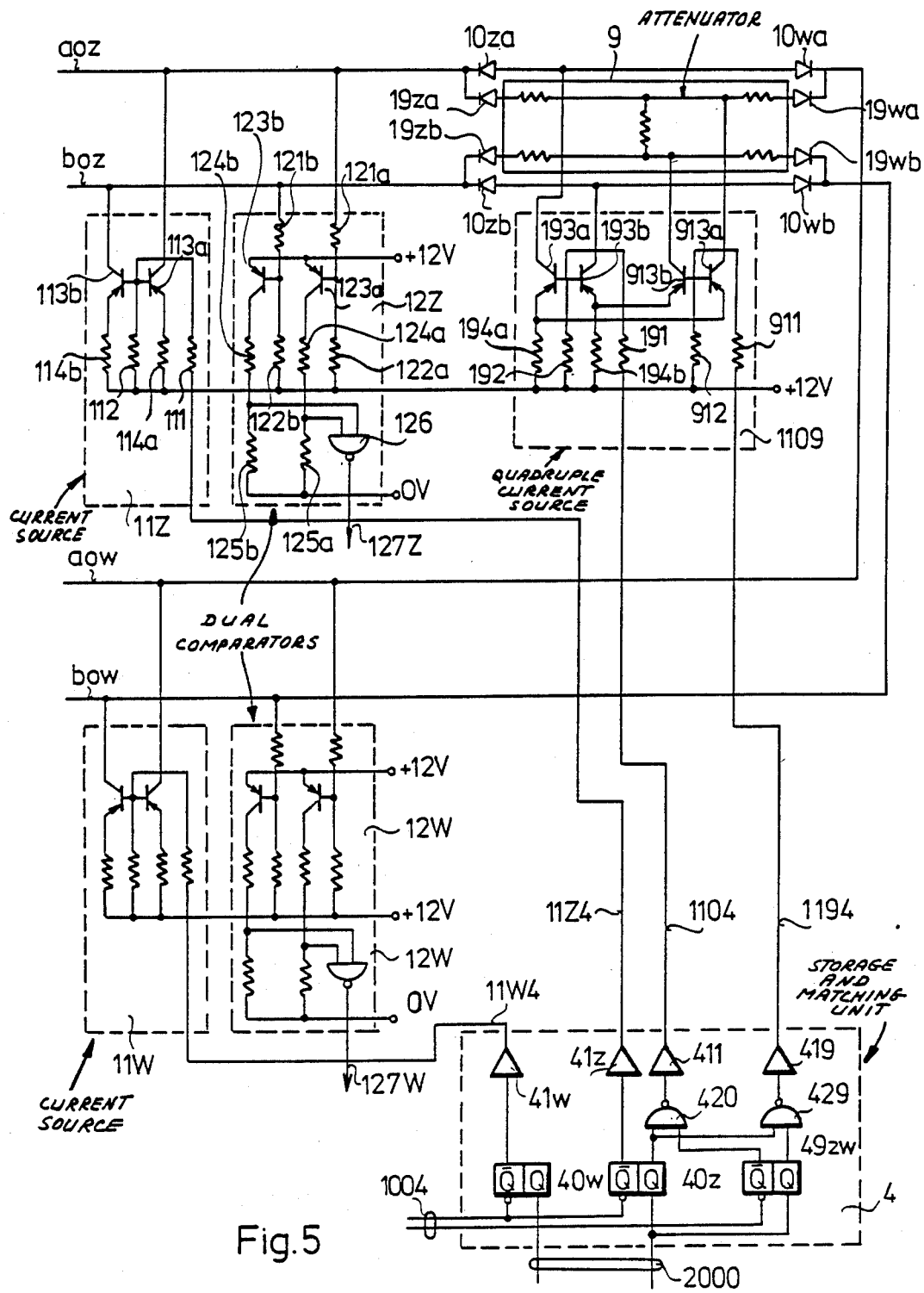
FIG. 5: Arrangement of the circuits connected to the last, in the example to the third stage of the switching-field with coupling path used in the solution according to the invention.

FIG. 5 shows the detailed build-up of the circuits arranged between output telephone lines aoz, boz, aow, bow of the third, or last switching matrices of the switching-field built up from the thyristor switching matrices according to the invention.

As a result of the address arriving on the line-cluster 1004 carrying the addresses of the storage and matching unit 4, the data arriving on the output data bus 2000 of the stored program control device 1 is written into one of the holding stores 40w of the storage and matching unit 4. The holding store 40w controls the controllable dual current source 11W on the control input 11W4 through driver 41w. Simultaneously with the writing of the holding store 40w, the writing is made into the holding store 40z as well, one of the outputs of which controls the controllable dual current source 11Z on control input 11Z4 through driver 41z. The output of driver 41z is open circuit type when no control takes place. Thus the transistors 113a and 113b of the controllable dual current source 11Z are in closed state. In controlled state the driver 41z switches 0 V potential to the control inputs 11Z4, as a result of which the controllable dual current source 11Z supplies current to the output telephone lines aoz, boz, the magnitude of which depends on the value of resistors 111, 112, 114a, 114b. The description related to the operation of the controllable dual current source 11Z is valid for the identically built up controllable dual current source 11W as well.

The output of the holding store 40z drives the controllable quadruple current source 1109 too through the NAND-gates 420 and 429 and drivers 411 and 419 with the aid of lines 1104 and 1194. Output O of holding store 40z is connected to the same inputs of NAND-gates 420, 429, while outputs O, Ō of the attenuation control store 49zw are connected to their other inputs.

Upon control of the holding store 40z, the control takes place on line 1104 or 1194 depending on the state of attenuation control store 49zw. As a result of the addresses arriving on line-cluster 1004, writing into the attenuation control store 49zw takes place similarly from the output data bus 2000 of the stored program control device 1. As a result of the OV potential appearing on line 1104, the dual current source built up from resistors 191, 192, 194a, 194b and transistors 193a, 193b gets into controlled state and the outflowing current passes through diodes 10za, 10wa and 10zb, 10wb. At the same time the open circuit output of driver 419 is switched onto the line 1194, and as a result, the second dual current source in the quadruple current source 1109 consisting of transistors 913a, 913b and resistors 911, 912, 194a, 194b does not emit current through the attenuator 9 toward diodes 19za, 19wa and 19zb, 19wb.

Upon changing the state of the attenuation control store 49zw, control of the dual current sources of the controllable quadruple current source 1109 will be interchanged.

The voltage arising on the output telephone lines aoz, boz of the switching matrix 10zC is lower than a suitably selected reference voltage when the switching matrices are switched on, and it is higher when the switching process was not sucessful. The same is valid for the output telephone lines aow, bow of switching matrix 10wC. The purpose of the dual comparators 12Z and 12W is to indicate these described states. In case of low voltage values on the output telephone lines aoz, boz, the resistance dividers 121b, 122b and 121a, 122a in the dual comparator 12Z open, and in case of high values they close the transistors 123a and 123b, which switch or do not switch the second voltage source potential +12 V to the voltage divider consisting of resistors 124b, 125b and 124a, 125a. The other end of the voltage dividers is on the 0 V potential of the first voltage source. The levels in the center of the dividers are received by the Schmitt-trigger inputs of the NAND-gates 126 and the data dependent on the state of the inputs appears on the output 127Z.

Operation and build-up of the dual comparator 12W are identical with those of the above described dual comparator 12Z. Thus the data appearing on output 127W refers to the voltage values arising on the output telephone lines aow, bow of switching matrix 10wC.

What is claimed is:

1. A switching-field with coupling path formed with switching matrices containing thyristors for program controlled switching devices comprising:
    a first plurality of telephone lines;
    a second plurality of telephone lines;
    a first transformer coupled to said first plurality of telephone lines and a second transformer, coupled to said second plurality of telephone lines, said first and second transformers each comprising primary and secondary coils;
    a first voltage source coupled to centers of said secondary coils;
    at least three stages of said switching-field whereby a first stage comprises a first pair of switching matrices, an input of said first pair being coupled to said first transformer; whereby a second stage comprises a second pair of switching matrices, an input of said second pair being coupled to said first pair, and whereby a third stage comprises a third pair of switching matrices, an input of said third pair being coupled to an output of said second pair;
    a first controllable dual current source coupled to an output of said third pair;
    dual comparators coupled to the output of said third pair, for monitoring switching of said switching-field;
    a first plurality of diodes comprising a first set of diodes coupled to the output of said third pair of switching matrices and a second set of diodes coupled to said output of said third pair of switching matrices;
    a first attenuator coupled to said first set of diodes and said second set of diodes;
    a second controllable dual current source being coupled to said first set of diodes and said second set of diodes;
    a second voltage source coupled to said second controllable dual current source;
    a storage and matching unit coupled to control inputs of said second dual current source whereby said storage and matching unit comprises two holding stores and a second attenuator;
    a plurality of actuating circuits coupled to said switching matrices by output allocating lines and input allocating lines;
    a plurality of line allocating circuits coupled to inputs of said plurality of actuating circuits for controlling said plurality of actuating circuits;
    a latch coupled to said plurality of line allocating circuits for passing address information to said plurality of line allocating circuits;
    a monostable multivibrator coupled to said latch for enabling said latch;
    a stored program device coupled to said monostable multivibrator and said latch for transmitting instructions containing addresses of outputs actuated in an actuating cycle; and
    a line selector coupled to said dual commparators and said stored program device for detecting states of said dual comparators and transmitting representations of said states to said stored program device.

2. A switching-field as defined in claim 1 whereby said actuating circuits comprise a first transistor comprising, a first emitter a first base and a first collector being coupled to output allocating lines of said switching matrices;
    a first resistor coupled to said first base of said transistor;
    a third voltage source coupled to said first resistor and said first emitter of said transistor;
    a second resistor coupled to said first base of said transistor and one of said plurality of line allocating circuits; and
    a third resistor coupled to said one of said plurality of allocating circuits and input allocating lines of said switching matrices.

3. A switching-field as defined in claim 2 whereby said first and second controllable dual current sources comprise:
    a third transistor comprising:
    a third base,
    a third emitter,
    a third collector being coupled to said output of said third pair of switching matrices;
    a second transistor comprising:
    a second base,
    a second emitter,
    a second collector being coupled to said output of said third pair of switching matrices, and said second base is coupled to said third base forming a junction;

a fourth resistor coupled to said third emitter and coupled to said second voltage source;

a fifth resistor coupled to said second voltage source;

a sixth resistor coupled to said second emitter and coupled to said second voltage source; and a seventh resistor coupled to said junction and coupled to said storage and matching unit.

4. A switching-field as defined in claim 2 whereby said third pair of switching matrices further comprise a controllable quadruple current source comprising:

a fourth transistor comprising:
a fourth base,
a fourth emitter, and
a fourth collector being coupled to said first set of diodes;

a fifth transistor comprising:
a fifth base,
a fifth emitter, and
a fifth collector being coupled to said second set of diodes, and said fifth base being coupled to said fourth base forming a second junction;

a sixth transistor comprising:
a sixth base,
a sixth emitter, and
a sixth collector being coupled to said first attenuator and said sixth emitter;

a seventh transistor comprising:
a seventh base,
a seventh emitter, and
a seventh collector being coupled to said first attenuator, said seventh base being coupled to said sixth base forming a third junction and said seventh emitter coupled to said fifth emitter;

an eighth resistor coupled to said fourth emitter and said second voltage source;

a ninth resistor coupled to said second junction and said second voltage source;

a tenth resistor coupled to said fifth emitter and coupled to said second voltage source;

an eleventh resistor coupled to said second junction and said storage and matching unit;

a twelfth resistor coupled to said third junction and said second voltage source; and a thirteenth resistor coupled to said third junction and said storage and matching unit.

5. A switching-field as defined in claim 4, whereby said dual comparators comprise:

an eighth transistor comprising:
an eighth base,
an eighth emitter, and
an eighth collector being coupled to said second voltage source;

a ninth transistor comprising:
a ninth base,
a ninth emitter, and
a ninth collector being coupled to said second voltage source;

a fourteenth resistor coupled to said eighth base and output of said third pair of switching matrices;

a fifteenth resistor coupled to said ninth base and output of said third pair of switching matrices;

a sixteenth resistor coupled to said ninth base and said second voltage source;

a seventeenth resistor coupled to said eighth base and said second voltage source;

an eighteenth resistor coupled to said eighth collector;

a nineteenth resistor coupled to said ninth collector;

a twentieth resistor coupled to said eighteenth resistor and said first voltage source;

a twenty-first resistor coupled to said nineteenth resistor and said first voltage source; and a NAND gate coupled to said nineteenth resistor, said eighteenth resistor, said twentieth resistor, said twenty-first resistor and said storage and matching unit, comprising a Schmitt-trigger input.

6. A switching field as defined in claim 5 wherein output of one of said holding stores in said storage and matching unit is connected to corresponding inputs of two logical NAND gates, outputs of said second attenuator being connected to other inputs of said two logical NAND gates, and outputs of said NAND gates being connected through drivers to control inputs of said quadruple current source whereby said second junction and said third junction form said control inputs.

7. A switching-field as defined in claim 6 wherein said switching matrices of two consecutive switching stages, said actuating circuits, and said line allocating circuits connected to inputs of said actuating circuits are arranged on a printed circuit board and interconnections are formed with printed wiring.

* * * * *